May 15, 1945.   H. B. JOHNSTON   2,376,147
PISTON AND PISTON RING
Filed April 29, 1942   2 Sheets-Sheet 1
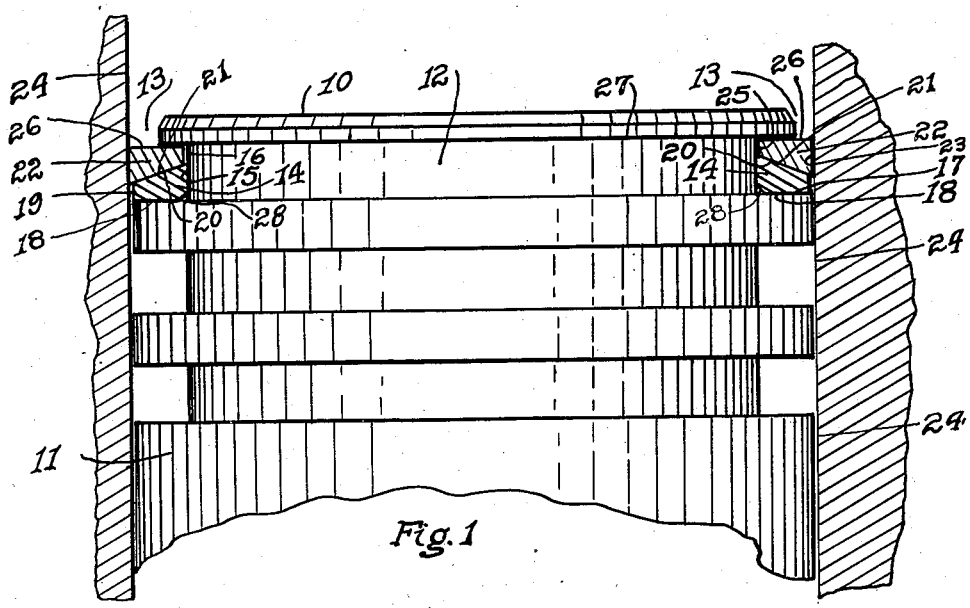
Fig.1
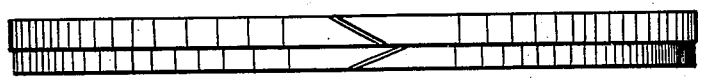
Fig.2
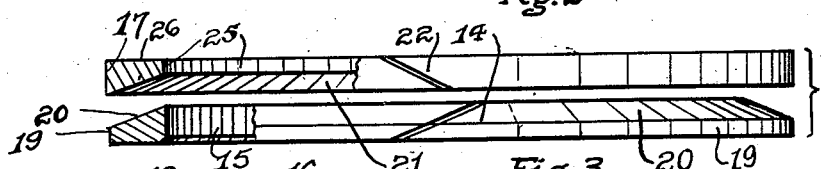
Fig.3
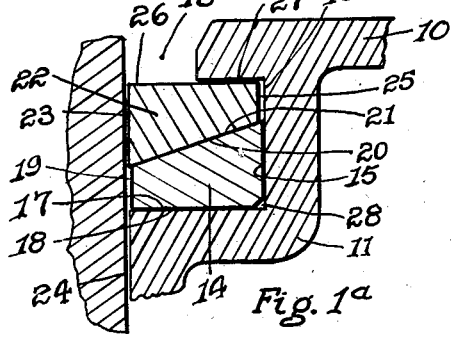
Fig.1ª
Inventor
Harry B. Johnston
By Walter W. Burns
Attorney May 15, 1945.  H. B. JOHNSTON  2,376,147
PISTON AND PISTON RING
Filed April 29, 1942  2 Sheets-Sheet 2

Inventor
Harry B. Johnston
By Walter W. Burns
Attorney

Patented May 15, 1945

2,376,147

UNITED STATES PATENT OFFICE 2,376,147

PISTON AND PISTON RING

Harry B. Johnston, Baldwin Park, Calif.

Application April 29, 1942, Serial No. 440,995

4 Claims. (Cl. 309—25)

This invention relates to pistons and piston rings and has particular relation to a ring which is expanded primarily by the end of the cylinder.

In internal combustion motors, it is very important that the piston rings not only hold tightly to restrain the gases from passing the piston but upon release of the pressure at the end of a stroke, to have the ring release its pressure and yet remain free in its groove—ready for instant sealing action when pressure is again applied. This is particularly true in internal combustion motors of the Diesel or semi-Diesel type where in the past great difficulty has been experienced in keeping the piston rings free.

The primary object of this invention is the provision of an improved piston ring for a rectangular groove which will expand against the cylinder wall in direct proportion to the fluid pressure at the piston head.

Another object of the invention is the provision of a piston ring having coacting circular sections, one of which, in operation, presses against the inner or back wall of the groove while another ring section presses against the cylinder wall to seal the space at the cylinder wall at the same time, the ring sections being so constructed that they will make a seal between each other to prevent the passage of fluids therebetween.

A further object of the invention is the provision of a piston ring having a pair of single-split coacting circular ring sections, one section operating to seal the cylinder wall and piston against the passage of fluids in one direction while the other section is against the back wall of the groove, the two sections filling a rectangular groove.

A still further object of the invention is the provision of a piston ring composed of a pair of single-split ring sections having coacting conical surfaces, one section having an inner surface of normal diameter, approximately equal to the diameter of the inside or back wall of a rectangular groove of a piston to normally seat thereon, the outside faces of the ring sections being in respective plans to fit side walls of the groove.

Another and still further object of the invention is the provision of a ring and groove construction wherein one single-split circular section, when in operation, will press outwardly on the cylinder wall while another single-split circular section will press all around the piston inwardly on the inner or back cylindrical wall of the groove.

Another and still further object of the invention is the provision of a piston ring for a piston ring groove of the rectangular cross section type, the ring having oppositely disposed plane surfaces and composed of a pair of single-split circular ring sections, one of the ring sections having a conical surface and inner cylindrical surface normally in contact at all times with the back or inner wall of the groove, the other ring section having a normally outwardly expanding tendency and having a conical surface in cooperative contact with the conical surface of the other ring section, the oppositely disposed plane surfaces normally being adjacent to or in contact with the opposite plane walls of the rectangular groove.

Other and further objects of the invention will be apparent to those skilled in the art from a reading of the complete specification.

Referring to the drawings, wherein the invention is illustrated,

Fig. 1 is a partial sectional view of a piston and ring embodying my invention.

Fig. 1a is a detail view of the ring on a larger scale than Fig. 1.

Fig. 2 is a side view of the ring as a whole, parts being shown in sections.

Fig. 3 is a view similar to Fig. 2 but with the ring sections separated.

In describing the invention, similar reference characters refer to the same or similar parts throughout the specification and drawings.

Figure 4:
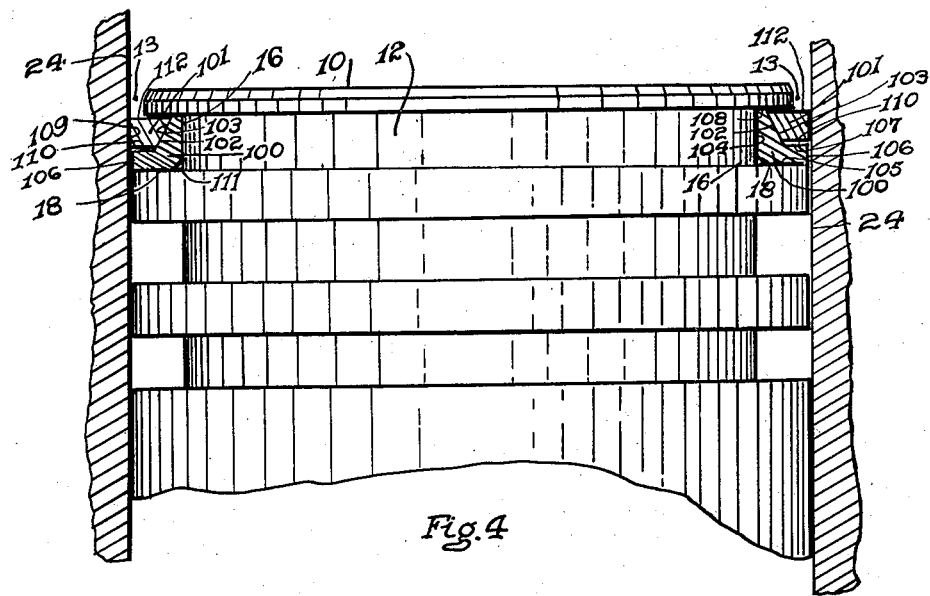
Fig. 4 is a view similar to Fig. 1 but of a modified form of the invention.

Referring particularly to Figs. 1 to 3 inclusive 10 designates the head of a piston having a side wall 11 and a groove 12. The groove 12 is of substantially rectangular cross section, the outer periphery of the head 22 being cut away as at 13 to permit the fluid pressure at the end of the piston to reach the top surface of the ring to cause one ring section to expand against the wall of the cylinder within which the piston operates as will be described.

Within the groove 12 is a substantially rectangular ring comprising two sections. The lower section 14 is provided with an inner substantially cylindrical surface 15 which has a normal diameter not greater than the inner or back wall 16 of the groove 12. The surface 15 is preferably of a diameter slightly less than the diameter of the inner wall 16 of the groove 12 in order that a very slight inward tension of the ring section 14 will hold it to its seat.

The plane surface 17 of the ring section 14 is in contact with the plane side wall 18 of the groove 12. The outer narrow cylindrical face 19 of the ring section 14 is substantially flush with the periphery of the piston.

On one side of the ring section 14 is a tapered or conical surface 20 which coacts with a similarly shaped tapered or conical surface 21 of the ring section 22.

This ring section 22 preferably has an outward resiliency tending to normally press its outer cylindrical surface 23 against the wall of the cylinder 24. The inner side of the ring section 22 is shown as a cylindrical surface 25 and the other surface 26 is plane and normally in contact with or adjacent the side wall 27 of the groove 12.

The ring section 14 is preferably beveled at the junction of the surfaces 15 and 17 as shown in Fig. 1 at 28. This feature assists in making tight installations in old piston grooves where the wall 18 may have been slightly worn.

In operation, the fluid pressure contacts the surface 26 by passing the cut away space 13. This pressure coming in contact with the surface 26, causes a tendency of the ring section 22 to be forced outwardly against the cylinder wall. At the same time, the tapered or conical surfaces 20, 21, coact to tend to force the ring section 14 against the inner or back wall 16 and the side wall 18 of the groove 12. Since the ring section 14 is normally against the wall 16, there will be no movement but a tight seal will be effected. Thus is prevented the passage of the fluid (1) outside of the ring, (2) inside of the ring and (3) between the ring sections—due to the coaction of the conical surfaces.

An advantage of this construction is that an installation may be made in an old piston—where the groove is larger than when made, and even though there may be a slight play, the tolerance is greater than with the usual rectangular construction.

Figure 5:
Fig. 5 is a view similar to Fig. 2 but of the ring of the modified form shown in Fig. 4.
Figure 6:
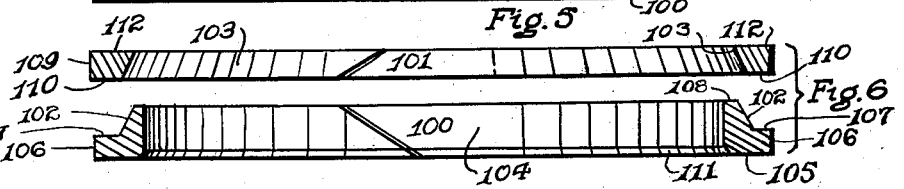
Fig. 6 is a view similar to Fig. 3 but of the ring of the modified form illustrated in Fig. 4.

The modification of Figs. 4, 5 and 6 has a piston head 10 of piston 11, with a rectangular groove 12 to receive the ring to be described. A cut away portion 13 allows fluid pressure to readily reach the ring.

In this modification as shown in detail in Fig. 4, the ring sections 100 and 101 have a pair of similar and coacting tapered or conical surfaces 102 and 103 which cooperate to prevent the passage of fluid pressure between the ring sections.

The ring section 100 has an inner cylindrical surface 104 which contacts with a similarly shaped inner wall 16 of the groove 12. The diameter of the cylindrical wall 16, relative to that of the inner surface 104 of the ring 100, is such that the ring has a normal position against the inner wall of the groove. In other words, the diameter of the cylindrical surface 104 is not greater than the diameter of the inner or back wall 16 of the groove and is preferably slightly less.

Adjacent the wall 18 of the groove 12, the ring section 100 has a plane surface 105, with which it is normally in contact or to which it is closely adjacent. The radial thickness of the ring section 100 is such that its outer cylindrical surface 106 does not extend beyond the periphery of the piston 11.

Between the surfaces 102 and 106, is a surface 107 which has no function by way of contact with another face, to prevent the passage of the fluid pressure.

Between the surfaces 102 and 104, there may be a surface 108 which is preferably close to the wall 27 of the groove 12 but does not necessarily have to contact this wall for the proper operation of the ring.

In cooperation with the ring section 100, the ring section 101 has its surface 103 already described and also has a cylindrical surface 109 which is in normal constant contact with the cylinder 24. A surface 110 extends between the surfaces 102 and 109 and opposite the surface 107 of the ring section 100. This surface 110 is normally out of contact with the surface 107 but the space therebetween furnishes a convenient pocket for oil to collect when the piston is making its downward stroke as shown in Fig. 4. As the piston reverses its movement, the oil is again spread on the cylinder wall. During the stroke downward as seen in Fig. 4, the oil is driven down by the ring and is not blown out by the fluid pressure—since it is tightly held by the tapered surfaces between the ring sections and the contacts between the surfaces 104 and 109 with the groove wall 16 and the cylinder wall 24, respectively.

A beveled edge 111 between the surfaces 104 and 105 allows for a filet between the groove walls 18 and 16, thus permitting the installation to be made in old pistons and where the wall 18 may have been worn. In spite of this wear, greater tolerance is possible without any sacrifice in the sealing quality of the ring.

The ring section 101 has an outer or top surface 112 which engages the groove wall 27 and holds the ring sections in relative operative position. It is this surface 112 which is primarily exposed to the fluid pressure which enters through the cut away portion 13 of the head.

In operation, as the fluid pressure forces downwardly on the surface 112 of the ring section 101, as shown in Fig. 4, the coaction between the surfaces 102 and 103, tends to contract the ring section 100 and expand the ring section 101. As the ring section 100 tends to contract, the surfaces 104 and 105 are forced against the walls 16 and 18, respectively, of the groove 12. The tendency for the ring section 101 to move outwardly against the cylinder wall 24 prevents the fluid passage between the ring and cylinder wall. Thus, the passage of the fluid pressure is prevented by (1) the coaction between the tapered or conical surfaces 102 and 103, (2) the passage behind the ring section 100 and (3) between the ring section 101 and the cylinder wall 24.

Figure 7:
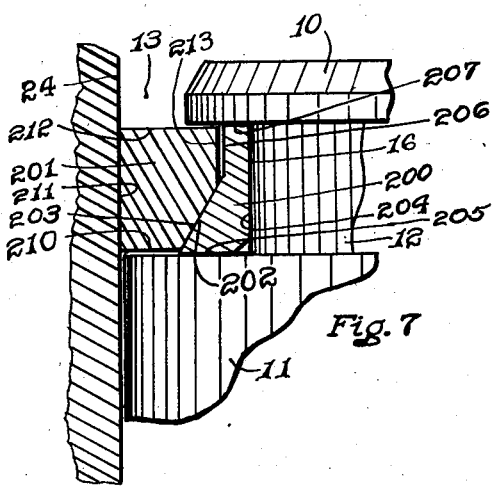
Fig. 7 is a sectional view similar to Fig. 1 but of a still further modified ring construction.

In Fig. 7 is a further modification wherein two ring sections 200, 201 have cooperating tapered or conical surfaces 202, 203.

The ring section 200 has an inner cylindrical surface 204 which contacts with the wall 16 of the groove 12 and a flat surface 205 which contacts with the wall 16 of the groove. This section 200 also has a cylindrical surface 206 extending from the tapered surface 202 and a narrow surface 207 opposite the surface 205.

The section 201 has a flat surface 210 opposite the groove wall 18, an outer cylindrical surface 211 for contact with the cylinder wall 24. It also has a fluid-pressure receiving surface 212 which is held in place by the groove surface 27. There is also an inner surface 213 between the surfaces 202 and 212.

The modifications in Figs. 4, 5, 6 and 7 are particularly useful where relatively low pressures are used in the cylinder.

While the invention has been described and illustrated in detail, it is to be understood the disclosure is merely illustrative and that modifications and changes may be made without departing from the spirit of the invention and within its scope as claimed.

Having described my invention, what I claim is:

1. In combination, a piston having a groove and being cut away between its end and the adjacent wall of the groove and a piston ring comprising two sections, each section having a single split and a conical surface coacting with a similar conical surface of the other section, one of the sections having an outwardly tapering cross section having a substantially plane surface in contact with a similarly shaped wall of the groove and having a cylindrical surface for normal contact with the back or inner wall of the groove, the other section having an inwardly tapering cross section having an outer cylindrical surface for contact with the cylinder in which the piston is to operate, the radial thickness of each section being not greater than the radial depth of the groove and of a size to be compressed to within the periphery of the piston.

2. In combination, a piston having a circumferential groove of substantially rectangular cross section and being cut away between its head and the adjacent wall of the groove, a piston ring comprising two sections, each having a single split and a conical surface coacting with a similar conical surface of the other section, one of the sections having an outwardly tapering cross section having a substantially plane surface in contact with a similarly shaped wall of the groove and having an inner cylindrical surface for normal contact with the inner or back wall of a piston groove, the other section having an inwardly tapering cross section having an outer cylindrical surface for contact with the cylinder in which the piston is to operate, the outer section having a greater radial width than axial width, the radial thickness of each section being not greater than the radial depth of the groove and of a size to be compressed to within the periphery of the piston.

3. In combination, a piston having a circumferential groove of substantially rectangular cross section and being cut away between its head and the adjacent wall of the groove, a piston ring comprising two sections, each having a single split and a conical surface coacting with a similar conical surface of the other section, one of the sections having an outwardly tapering cross section having a substantially plane surface in contact with a similarly shaped wall of the groove and having an inner cylindrical surface for normal contact with the inner or back wall of a piston groove and being of a normal diameter not greater than the diameter of the said inner or back wall, the other section having an inwardly tapering cross section having an outer cylindrical surface for contact with the cylinder in which the piston is to operate, the radial thickness of each section being not greater than the radial depth of the groove and of a size to be compressed to within the periphery of the piston.

4. In combination, a piston having a circumferential groove of substantially rectangular cross section and having a portion cut away between the piston end and the groove, a piston ring comprising two sections, each having a single split and a conical surface coacting with a similar conical surface of the other section, one of the sections having an outwardly tapering cross section having a substantially plane surface in contact with a similarly shaped wall of the groove and having an inner cylindrical surface for normal contact with the inner or back wall of a piston groove and being of a normal diameter not greater than the diameter of the said inner or back wall, the other section having an inwardly tapering cross section having an outer cylindrical surface for contact with the cylinder in which the piston is to operate and having a normal outward resilient pressure for keeping a constant pressure against the cylinder wall, the radial thickness of each section being not greater than the radial depth of the groove and of a size to be compressed to within the periphery of the piston.

HARRY B. JOHNSTON.